US 6,715,353 B2

(12) United States Patent
Johnson

(10) Patent No.: US 6,715,353 B2
(45) Date of Patent: Apr. 6, 2004

(54) MEMS GYROSCOPE WITH PARAMETRIC GAIN

(75) Inventor: Burgess R. Johnson, Bloomington, MN (US)

(73) Assignee: Honeywell International, Inc., Morristown, NJ (US)

( * ) Notice: Subject to any disclaimer, the term of this patent is extended or adjusted under 35 U.S.C. 154(b) by 12 days.

(21) Appl. No.: 10/132,056

(22) Filed: Apr. 25, 2002

(65) Prior Publication Data
US 2003/0200804 A1 Oct. 30, 2003

(51) Int. Cl.[7] ............................................. G01P 9/00
(52) U.S. Cl. ............................. 73/504.04; 73/504.12
(58) Field of Search ..................... 73/504.02, 504.04, 73/504.12, 504.03, 514.32, 514.16, 504.13, 504.14, 504.15

(56) References Cited

U.S. PATENT DOCUMENTS

| 5,911,156 A | 6/1999 | Ward et al. ............... 73/504.16 |
| 5,952,572 A * | 9/1999 | Yamashita et al. ........ 73/504.04 |
| 5,992,233 A | 11/1999 | Clark ....................... 73/514.35 |
| 6,067,858 A * | 5/2000 | Clark et al. .............. 73/504.16 |
| 6,393,913 B1 * | 5/2002 | Dyck et al. .............. 73/504.12 |
| 6,526,826 B2 * | 3/2003 | Kurachi et al. .......... 73/504.02 |

* cited by examiner

Primary Examiner—Helen Kwok
(74) Attorney, Agent, or Firm—Schwegman, Lundberg, Woessner & Kluth, P.A.

(57) ABSTRACT

A microelectromechanical (MEMS) gyroscope has one or more proof masses mechanically coupled to a substrate by springs. A motor force drives the proof masses at their resonant frequency in one direction, 180 degrees out of phase with each other in the case of a dual proof mass gyroscope. Sense electrodes sense motion of the proof masses in response to a Coriolis force. The motion caused by the Coriolis force is perpendicular to the motion caused by the motor force. An AC pump voltage at twice the motor frequency is applied to the sense electrodes to provide parametric amplification of the Coriolis force. The AC pump voltage alters the mechanical and electrical gain of the gyroscope.

23 Claims, 9 Drawing Sheets

MEMS GYROSCOPE WITH PARAMETRIC GAIN

FIELD OF THE INVENTION

The present invention relates to microelectromechanical gyroscopes, and in particular to a microelectromechanical gyroscope having parametric gain.

BACKGROUND OF THE INVENTION

Microelectromechanical (MEMS) gyroscopes are used to detect rotation about an axis. A typical MEMS gyroscope consists of one or more mechanically coupled proof masses formed from silicon. The masses are coupled to a silicon or pyrex substrate by suspension type bridges that act as springs. The gyroscope has two closely spaced modes of oscillation. One of the modes, a motor mode, is driven by electrostatic force at its resonant frequency to produce a relatively large amplitude of oscillation. When rotation is applied to the gyroscope, a Coriolis force is produced which is proportional to the velocity of the proof mass in the motor mode. The Coriolis force drives the second mode of oscillation, the sense mode, of the gyroscope.

One or more sense electrodes are positioned proximate the proof masses which also act as electrodes, to form capacitors. A bias voltage is applied to the sense electrodes so that motion of the proof masses produces an output current. A significant difficulty with MEMS gyroscopes is that small physical asymmetries in the devices can cause a small fraction of the motor mode force to cause some oscillation in the sense mode of oscillation. This mechanical feedthrough signal is referred to as the quadrature signal, because it is 90 degrees out of phase with the Coriolis signal.

The quadrature signal can be quite large, because it is proportional to the large amplitude motor mode oscillation. In contrast, the sense mode motion due to the Coriolis force is typically orders of magnitude smaller than that of the motor mode oscillation. Thus, the quadrature signal may be much larger than the desired Coriolis signal. The quadrature signal can be partially reduced after sensor output by using phase-sensitive detection, or compensated for by calibrating the motor drive at manufacture, or by injecting a compensating current into the sensor using a feedback loop. However, the large ratio of quadrature to Coriolis signals puts severe constraints on the phase error in the phase-sensitive detector.

SUMMARY OF THE INVENTION

A microelectromechanical (MEMS) gyroscope has two proof masses mechanically coupled to a substrate by springs. A motor force drives the proof masses at their resonant frequency in one direction, 180 degrees out of phase with each other. Sense electrodes sense motion of the proof masses in response to a Coriolis force. The motion caused by the Coriolis force is perpendicular to the motion caused by the motor force. An AC pump voltage at twice the motor frequency is applied to the sense electrodes to provide parametric amplification of the Coriolis force.

The AC pump voltage on the sense electrodes produces a larger output signal from the Coriolis input force than from a quadrature input force of similar amplitude. The AC pump voltage accomplishes this by altering the mechanical and electrical gain of the gyroscope.

DETAILED DESCRIPTION OF THE INVENTION

In the following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

Figure 2:
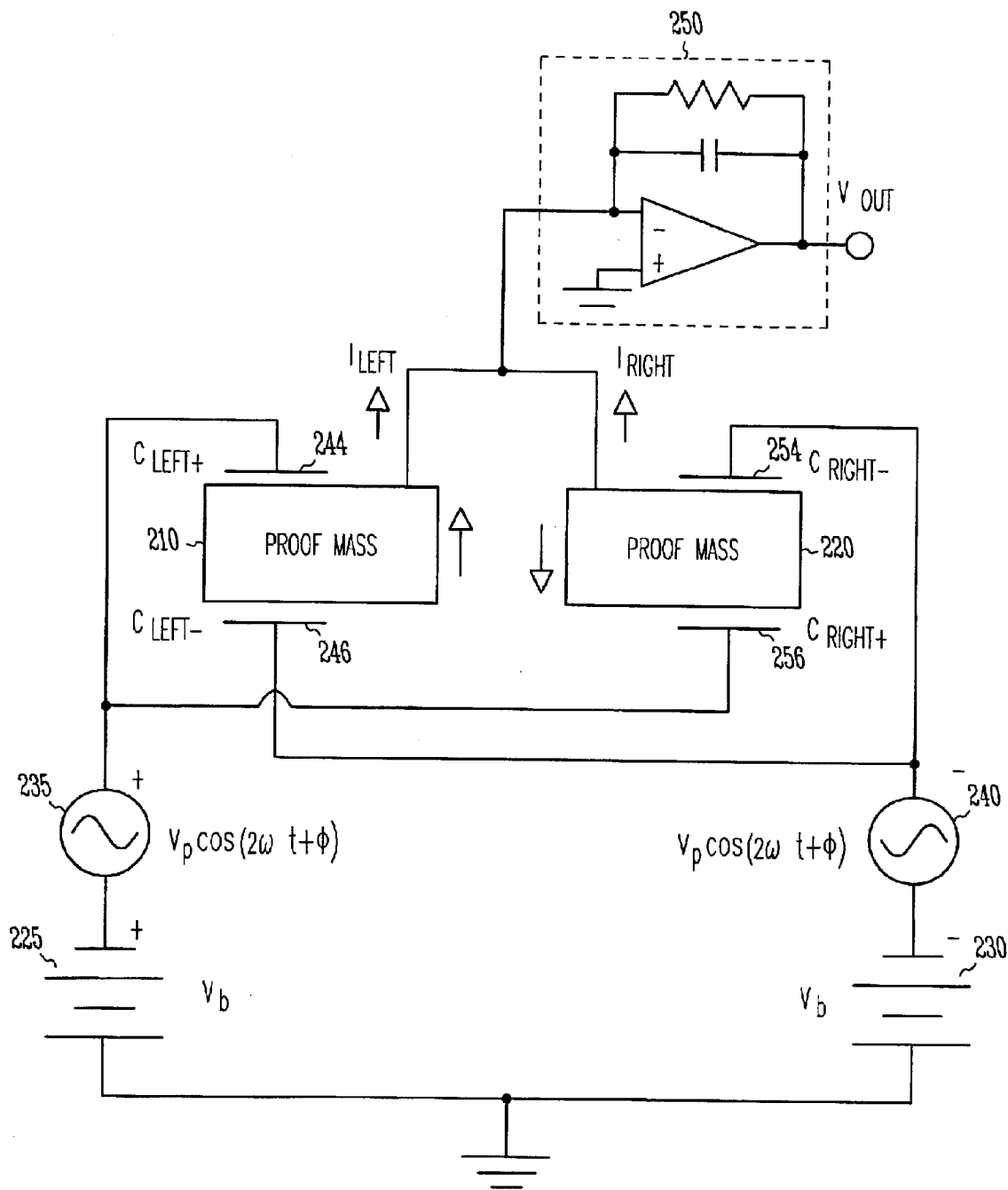
FIG. 2 is an electromechanical schematic block diagram of a MEMS gyroscope of FIG. 1 having parametric amplification of Coriolis force.

A block diagram of a MEMS gyroscope having parametric amplification of Coriolis force is shown generally at 100 in FIG. 2. Two proof masses, 110 and 115 are formed from silicon, pyrex, or other suitable material, and reside on a substrate, such as silicon, or pyrex, or other suitable material. The proof masses 110 and 115 are suspended by springs 120 and 125, such as folded beam suspensions in a known manner. The springs 120 and 125 allow oscillation of the suspended masses in response to one or more forces applied to the masses.

In one embodiment, comb finger capacitors are provided in a known manner to couple the masses to a motor force. The springs 120 and 125 are also used to represent the comb finger capacitors for simplification of known structures. The motor force is provided in the form of an oscillating voltage that provides a force at approximately the resonant frequency of the proof masses 110 and 115, causing them to oscillate at their resonant frequency in a direction represented by dual headed arrows 140 and 145. In one embodiment, the proof masses are formed as close to identical as possible to ensure both are affected by the motor force in the same manner.

Figure 1:
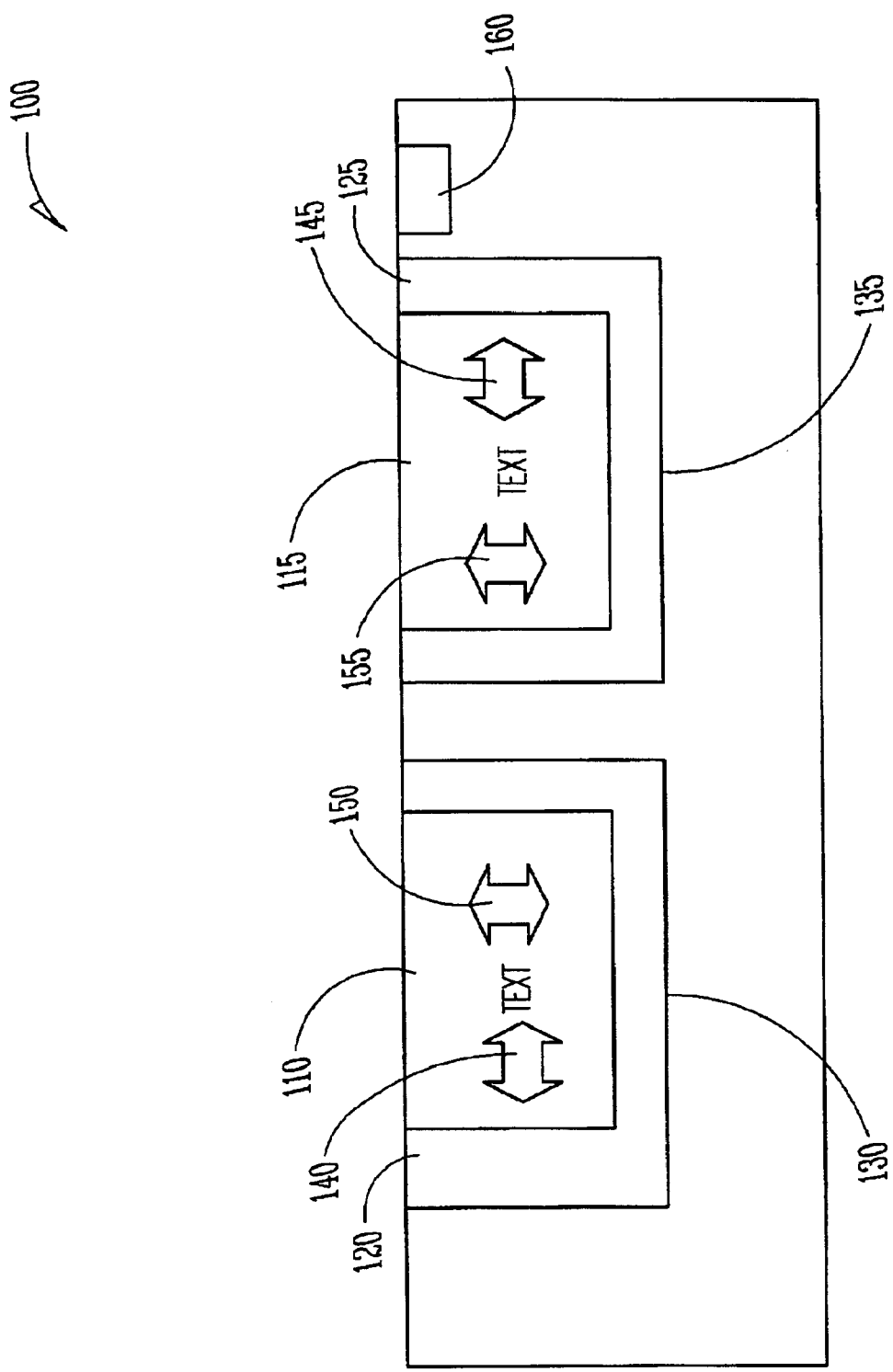
FIG. 1 is a block diagram of a MEMS gyroscope having parametric amplification of Coriolis force.

Sense capacitor electrodes positioned at 130 and 135 in one embodiment are provided to detect motion of the proof masses in response to rotational force around an axis pointing into the structure of FIG. 1. The motion is represented by dual headed arrows 150 and 155, which are approximately perpendicular to the motion caused by the motor force. Circuitry at 160 is coupled to provide both the motor force, and to measure the motion caused by the rotational force, or Coriolis force. The Coriolis force is measured from the capacitor electrodes 130 and 135, with the proof masses serving as electrodes to complete the sense capacitors. In one embodiment, electrodes 130 and 135 are metalized layers of the substrate beneath the proof masses.

Circuitry 160 also provides a pumping force via the sense capacitors to create degenerate parametric amplification of the Coriolis force. The pumping force is provided as an AC pump voltage signal at approximately twice the motor resonant frequency of the proof masses. The measured signal from the sense capacitors is then demodulated and subjected to a low pass filter at 160.

The AC pump voltage alters the mechanical gain and the electrical gain of the gyroscope 100. The pump voltage provides an electrostatic force on the sense electrodes that causes the effective mechanical spring constant to oscillate at twice the motor frequency in a plane with opposite oscillatory phases. Thus, the gyroscope 100 becomes a mechanical parametric amplifier, and the mechanical gain depends on the phase angles of the input driving force and the pump voltage. The mechanical gain for the Coriolis input force is usually larger than for the quadrature input force from the motor force.

The output current for a given mechanical oscillation amplitude depends on the phase angles of the mechanical oscillation and the pump voltage. Thus, the conversion efficiency of mechanical displacement to electrical current (the electrical gain) is usually larger for the Coriolis force than for the quadrature force. In fact, the quadrature output signal is essentially zero when the amplitude of the AC pump voltage is twice a DC bias voltage, and the phase of the pump voltage is properly chosen.

Figure 3:
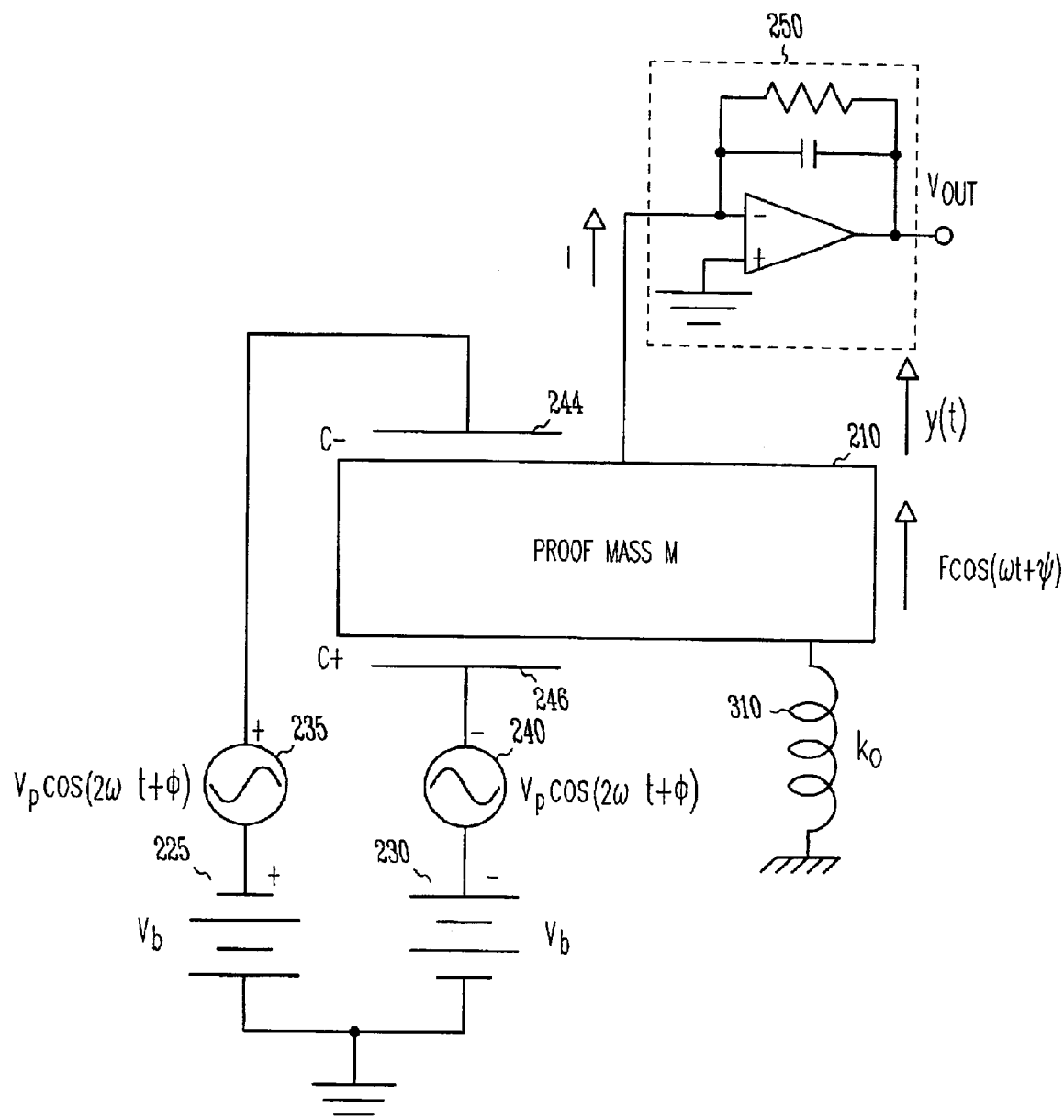
FIG. 3 is a simplified electromechanical schematic block diagram of a portion of the MEMS gyroscope of FIG. 2.

FIGS. 2 and 3 show electromechanical schematic block diagrams of a MEMS gyroscope having two sense capacitors. By using two sense capacitors on each proof mass, and biasing them with a DC voltage as shown in FIG. 2, the static equilibrium position of the proof mass is unchanged from its value with no applied voltage. Alternatively, with only one sense capacitor on each proof mass, the static equilibrium position of the proof mass shifts when voltage is applied. The use of two sense capacitors on each proof mass offers performance advantages due to the increased symmetry. However, fabricating only one sense capacitor on each proof mass frequently has the advantage of lower fabrication cost. Performance improvements obtained with the present invention are applicable regardless of the static equilibrium position of the proof mass. In one embodiment, the electrostatic force in the single sense capacitor embodiment is not large enough to pull the proof mass against a sense electrode.

In FIG. 2, two mechanically coupled proof masses 210 and 220 are driven in opposite directions by a Coriolis input force, or by a quadrature force originating from the applied motor force on the gyroscope. In this embodiment, two capacitors, comprising electrodes $C_{left+}$ 244 and $C_{left-}$ 246, are positioned either side of proof mass 210, which also serves as an electrode between the left plus and minus electrodes. The electrodes are driven by DC voltage sources 225 and 230, and AC pump voltage sources 235 and 240. Current, $I_{left}$, sensed from the proof mass electrode is provided to an output circuit 250.

Proof mass 220 also serve as an electrode between electrodes $C_{right-}$ 254 and $C_{right+}$ 256. These electrodes are also driven by the DC and AC sources, but 180 degrees out of phase from proof mass 210. Current, $I_{right}$, sensed from proof mass electrode 254 is summed with $I_{left}$ and provided to the output circuit 250.

FIG. 2 is an electromechanical schematic block diagram of a MEMS gyroscope with dc bias and ac pump voltage applied to the sense capacitors of the two proof masses. The two proof masses are mechanically coupled together and mechanically coupled to the substrate, though this mechanical coupling is not shown. The electronic charge preamplifier is also shown.

FIG. 3 is a simplified model of the MEMS gyroscope of FIG. 2, and is used as a model for a detailed calculation of the output signal from a MEMS gyroscope having parametric gain. Numbering in FIG. 3 is consistent with that of FIG. 2, with proof mass 210 being shown. In addition, a spring constant 310 is represented as $k_o$.

What follows is a detailed calculation of the output signal from a MEMS gyroscope having parametric gain, based on the model shown in FIG. 3. FIG. 3 shows one of the two proof masses depicted in FIG. 2, with its two sense electrodes. The spring shown in FIG. 3 is chosen to have a spring constant $k_o$ such that $k_o=m\omega_s^2$, where $\omega_s$ is the sense resonant frequency, and m is the mass of the single proof mass shown in FIG. 3. The sense electrodes in the model of FIG. 3 are biased by dc bias voltages $\pm V_b$ and an ac pump signal $\pm V_p\cos(2\omega t+\phi)$, where $\omega$ is the frequency at which the gyroscope is driven electrostatically (the motor mode), and $\phi$ is the phase angle of the pump voltage. It is important that the frequency of the pump signal be twice that of the driven motor motion. The output current of the model in FIG. 3 will be half of the output current of the model in FIG. 2. In all other respects, the two models are equivalent.

In one embodiment, the sense electrodes 244 and 246 each comprise a plurality of fingers. The proof mass 210 also has a plurality of electrode fingers extending from the proof mass toward the substrate. A finger from each of the sense electrodes 244 and 246 having positive and negative polarities are disposed between two adjacent proof mass fingers such that the oscillating source voltages alternately draws the proof mass toward and away from the sense electrode fingers as is known in the art. In an alternative embodiment, the sense electrodes comprise parallel plates positioned above and below the proof mass, also as is known in the art.

FIG. 3 is a simplified model of the MEMS gyroscope shown in FIG. 2. The gyroscope output signal depends on the product of the mechanical gain and electrical gain. The mechanical gain will be calculated first, followed by the electrical gain.

Mechanical Gain: Consider a time varying force F cos ($\omega t+\psi$) applied to the mass m, at the frequency $\omega$ of the motor motion of the gyroscope. Such a force could be due to the Coriolis effect when the sensor experiences rotation. Alternatively, the force could be due to mechanical feedthrough from the motor motion, producing a quadrature signal. We will use the phase convention that $\psi=0$ or $\pi$ for a Coriolis force, and $\pm\pi/2$ for a quadrature force. The equation of motion of the mass m is given by:

$$m\frac{d^2y}{dt^2}+\gamma\frac{dy}{dt}+k_o y = \qquad (1)$$

$$F\cos(\omega t+\psi)+\frac{1}{2}\left(\frac{\partial C_+}{\partial y}+\frac{\partial C_-}{\partial y}\right)(V_b+V_p\cos(2\omega t+\phi))^2$$

The objective is to solve equation (1) for the displacement y(t) of the proof mass. In equation (1), $C_+$ and $C_-$ are the two sense capacitances on opposite sides of the proof mass, y is the displacement of the proof mass, and $\gamma$ is the damping constant for the sense mode. The rightmost term in equation (1) represents the electrostatic forces on the proof mass due to the applied voltages on the sense electrodes. The derivatives of $C_+$ and $C_-$ with respect to y can be expanded in powers of y, resulting in:

$$\frac{\partial C_\pm}{\partial y} = \left[\frac{\partial C_\pm}{\partial y}\right]_{y=0} + \left[\frac{\partial^2 C_\pm}{\partial y^2}\right]_{y=0} y + \ldots \quad (2)$$

The two sense capacitors $C_+$ and $C_-$ are identical at $y=0$. Because the two identical capacitors are located on opposite sides of the proof mass, the general relation $C_+(y)=C_-(-y)$ is true. It follows from this relation that at $y=0$, the first derivatives of $C_+$ and $C_-$ have equal magnitudes and opposite signs, and the second derivatives are equal. Using these facts, and keeping only the first two terms of equation (2) (small displacement approximation), equation (1) becomes:

$$m\frac{d^2 y}{dt^2} + \gamma \frac{dy}{dt} + \left[k_o - \frac{1}{2}\left(\frac{\partial^2 C}{\partial y^2}\right)_{y=0}(V_b + V_p \cos(2\omega t + \phi))^2\right] y = \quad (3)$$

$$F\cos(\omega t + \psi),$$

where the total sense capacitance $C=C_+ + C_-$. Equation (3) shows clearly that the spring constant is altered by the applied voltages.

In a MEMS gyroscope, $\omega$ is chosen to be close to the sense mode resonant frequency $\omega_S$. Thus, the term in $y(t)$ at frequency $\omega$ is much larger than the higher harmonic terms, and the higher harmonic terms can be neglected. Thus, assume a solution for $y(t)$ of the form:

$$y(t) = y_1 \cos(\omega t + \theta) \quad (4)$$

where $\theta$ and $y_1$ are the phase angle and amplitude of the displacement of the mass m. Inserting the solution given by equation (4) into equation (3) results in:

$$\left[-\omega^2 m + k_o - \frac{1}{2}\left(\frac{\partial^2 C}{\partial y^2}\right)_{y=0}\left(V_b^2 + \frac{V_p^2}{2}\right)\right] y_1 \cos(\omega t + \theta) - \quad (5)$$

$$\left(\frac{\partial^2 C}{\partial y^2}\right)_{y=0} \frac{V_b V_p}{2} y_1 \cos(\omega t + \phi - \theta) = F\cos(\omega t + \psi)$$

Equation (5) shows that the mechanical response amplitude $y_1$ will be proportional to the driving force F. The damping term is neglected in equation (5), because the separation between the sense and motor frequencies is typically chosen to be large enough that the damping term is negligible. The first term in equation (5), proportional to $\cos(\omega t+\theta)$, shows that both the dc and ac applied voltages contribute to a shift in the sense resonant frequency due to electrostatic spring softening.

The second term on the left hand side of equation (5), proportional to $\cos(\omega t+\phi-\theta)$, produces the parametric gain. This term causes the displacement $y_1$ of the proof mass to be dependent on the phase angle $\phi$ of the pump signal and the phase angle $\psi$ of the driving force.

Equation (5) is solved for $y_1$ and $\theta$, and such that the solutions are valid for all time t. Evaluating equation (5) at two values of $\omega t$ differing by $\pi/2$ gives two independent equations that can be solved for the two unknowns $y_1$ and $\theta$. Thus, setting $\omega t=-\psi$ and $\omega t=-\psi-\pi/2$, gives the following two equations:

$$[A\cos(\theta-\psi)+B\cos(\phi-\theta-\psi)]y_1 = F \quad (6)$$

$$[A\sin(\theta-\psi)+B\sin(\phi-\theta-\psi)]y_1 = 0 \quad (7)$$

The coefficients A and B are defined by:

$$A = -\omega^2 m + k_o - \frac{1}{2}\left(\frac{\partial^2 C}{\partial y^2}\right)_{y=0}\left(V_b^2 + \frac{V_p^2}{2}\right) \quad (8)$$

$$B = -\left(\frac{\partial^2 C}{\partial y^2}\right)_{y=0} \frac{V_b V_p}{2} \quad (9)$$

Equation (7) is solved for $\theta$. The resulting solution is inserted into equation (6), which is then solved for $y_1$. The values of $\phi$ and $\psi$ that are of interest are $\phi=0$ or $\pi$, and $\psi=0$ or $\pi/2$. For the resulting four sets of values of $\phi$ and $\psi$, the solutions for $y_1$ and $\theta$ are given in Table 1.

TABLE 1

Solutions of equations (6) and (7) for $\theta$ and $y_1$, for given values of $\phi$ and $\psi$. The phase-dependent parametric gain is apparent in the dependence of $y_1$ on $\phi$ and $\psi$.

| $\phi$ | $\psi$ | $\theta$ | $y_1$ |
|---|---|---|---|
| 0 | 0 | 0 | $\frac{F}{A+B}$ |
| 0 | $\pi/2$ | $\pi/2$ | $\frac{F}{A-B}$ |
| $\pi$ | 0 | 0 | $\frac{F}{A-B}$ |
| $\pi$ | $\pi/2$ | $\pi/2$ | $\frac{F}{A+B}$ |

Table 1 shows that the amplitude $y_1$ of the mechanical response of the gyroscope depends on the phase $\phi$ of the pump voltage and the phase $\psi$ of the input force. The pump voltage phase can be chosen to make the mechanical response in the presence of a Coriolis force ($\psi=0$) either larger or smaller than the response due to the quadrature ($\psi=\pi/2$) force. Note that if $A=-B$, the mechanical gain will be infinite for certain values of $\phi$ and $\psi$. A practical MEMS gyroscope should avoid this instability. Thus, the practical ratio of Coriolis mechanical gain to quadrature mechanical gain will be limited, since this ratio becomes very large only if A is comparable to $-B$.

Electrical Gain: The output current is the sum of the currents from the two sense capacitors $C_+$ and $C_-$, which have applied voltages $V_+$ and $V_-$:

$$I = \frac{d}{dt}(C_+ V_+ + C_- V_-), \quad (10)$$

where $$C_\pm = C_{\pm 0} + \left[\frac{\partial C_\pm}{\partial y}\right]_{y=0} y_1 \cos(\omega t + \theta), \quad (11)$$

and $C_{\pm 0}$ is the static equilibrium capacitance. As noted previously, the first derivatives of $C_+$ and $C_-$ with respect to y have equal magnitudes and opposite signs at $y=0$. Also, $C_{+0}=C_{-0}$, and $V_+=-V_-=V_b+V_p\cos(\omega t+\theta)$. With these results, equation (10) becomes:

$$I = 2\left[\frac{\partial C_+}{\partial y}\right]_{y=0} \frac{d}{dt}[y_1 \cos(\omega t + \theta)(V_b + V_p \cos(2\omega t + \phi))] \quad (12)$$

Taking the time derivative in equation (12), and keeping only terms of frequency ω (it is assumed that the higher harmonics can be electrically filtered out), the following expression for the output current is obtained:

$$I = -2\omega y_1 \left[\frac{\partial C_+}{\partial y}\right]_{y=0} \left[V_b \sin(\omega t + \theta) + \frac{V_p}{2}\sin(\omega t + \phi - \theta)\right] \quad (13)$$

Equation (13) shows that the electrical gain depends on the phase φ of the pump voltage. For the case φ=0 the Coriolis (θ=0) and quadrature (θ=π/2) output currents are:

$$\text{Coriolis: } I(\theta = 0) = -2\omega y_1 \left[\frac{\partial C_+}{\partial y}\right]_{y=0} \left(V_b + \frac{V_p}{2}\right)\sin(\omega t) \quad (14)$$

$$\text{quadrature: } I(\theta = \pi/2) = -2\omega y_1 \left[\frac{\partial C_+}{\partial y}\right]_{y=0} \left(V_b - \frac{V_p}{2}\right)\cos(\omega t) \quad (15)$$

Equations (14) and (15) show that the ratio of the electrical gain for the Coriolis signal to that of the quadrature signal can be very large. In particular, the quadrature electrical gain is zero if $V_p=2V_b$.

Two specific examples of the invention are described, for two sets of operating parameters of a MEMS gyroscope. In the first example, the gyroscope is designed so that the quadrature signal is nulled. In the second example, the gyroscope is designed to achieve high gain for the Coriolis signal, so that the output signal-to-noise ratio is dominated by thermal Brownian motion noise in the proof mass rather than the noise in the readout electronics.

Figure 4:
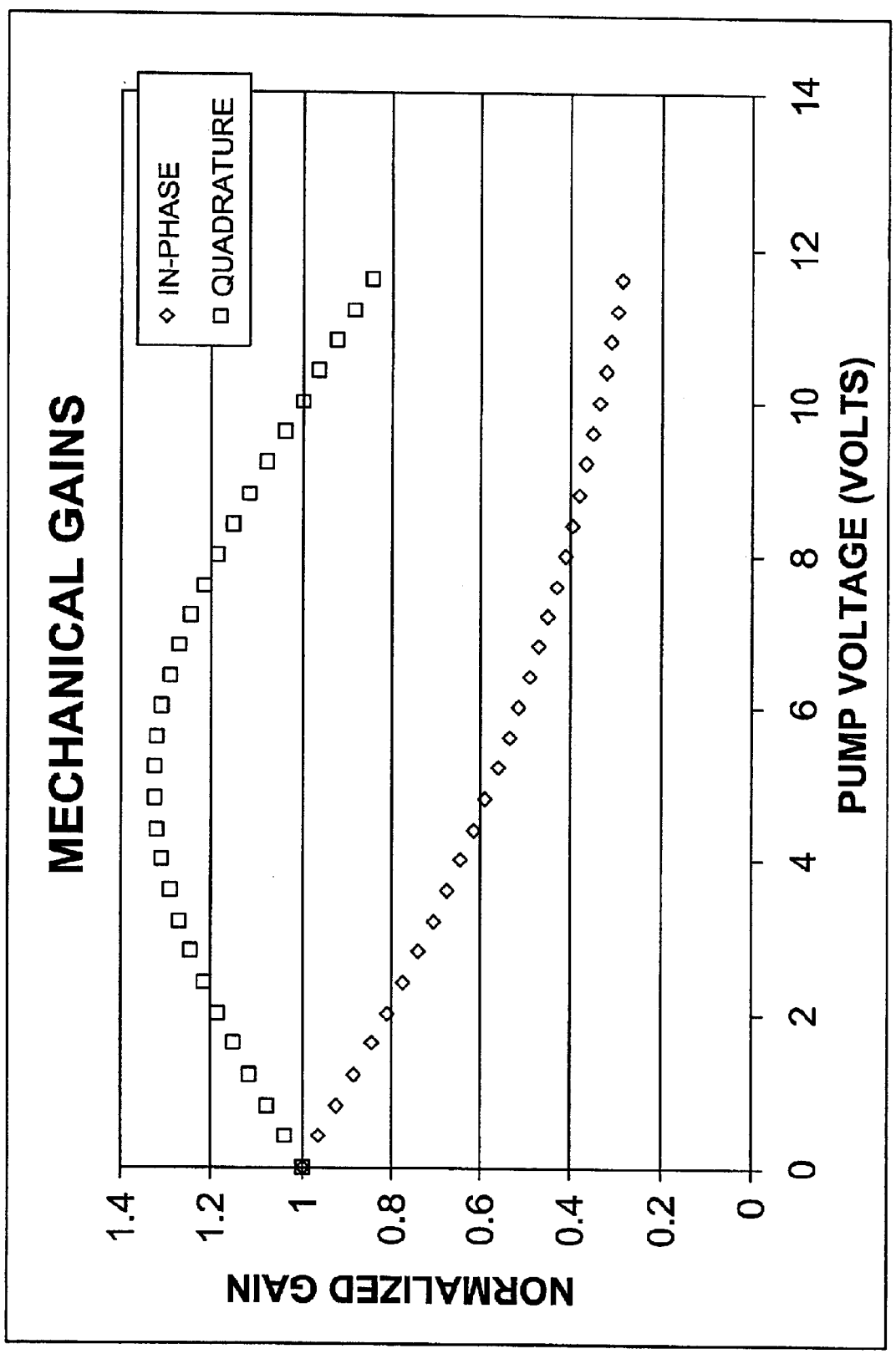
FIG. 4 is a graph showing mechanical gain as a function of pump voltage for one embodiment of the invention.
Figure 5:
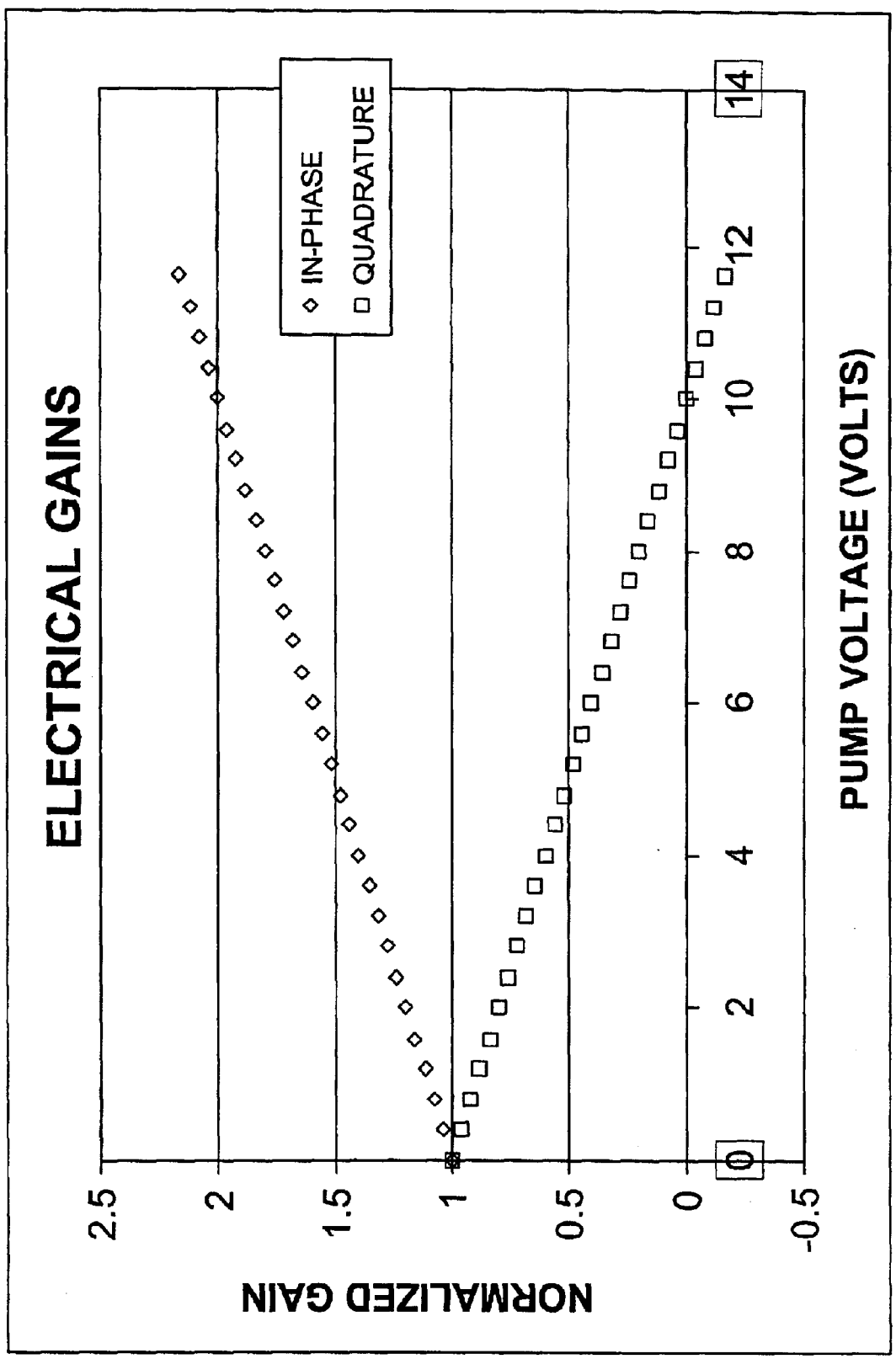
FIG. 5 is a graph showing electrical gain as a function of pump voltage for one embodiment of the invention.
Figure 6:
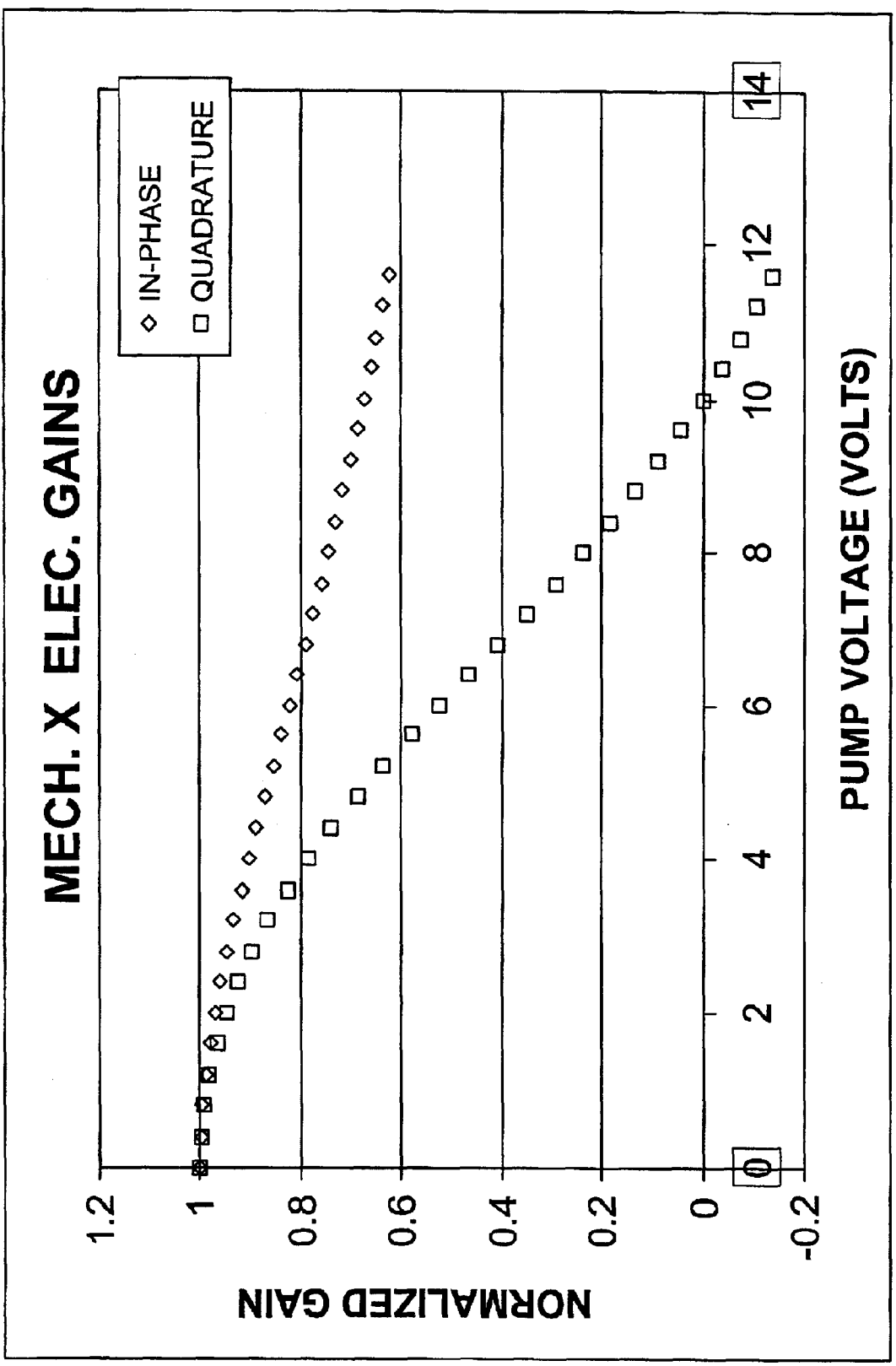
FIG. 6 is a graph showing total gain as a function of pump voltage for one embodiment of the invention.

Design for null quadrature output current: Equation (15) shows that the output current due to quadrature motion of the proof mass is zero, when the pump phase φ=0 and $V_p=2V_b$. Typically, when the pump voltage is high enough to satisfy this condition, care must be taken to avoid the instability condition A=−B. The instability is avoided by designing the gyroscope so that the sense frequency is below the motor frequency. When this is done, A and B have the same sign for all positive values of $V_b$ and $V_p$, when φ=0. Thus, instability does not occur. This is similar to the unconditional stability that occurs when only dc bias voltage is used, and the sense frequency is below the motor frequency. In that case, electrostatic spring softening shifts the sense frequency downward, so that the sense and motor frequencies are never equal and the scale factor is never infinite. Table 2 shows the design parameters for a MEMS gyroscope that achieves null quadrature output current at a pump voltage of 10 V, without instability. FIGS. 4, 5, and 6 show the mechanical gain, electrical gain, and total gain for this design, as functions of the pump voltage. FIG. 6 clearly shows a reduction of scale factor as the pump voltage is increased (scale factor is proportional to total gain of the Coriolis signal). However, for many applications of MEMS gyroscopes, this is a small price to pay for achieving complete nulling of the quadrature signal without complex electronic circuitry.

| Parameter | Value | Units |
|---|---|---|
| Motor resonant frequency | 11,000 | Hz |
| Sense resonant frequency ($V_b$ = 0, $V_p$ = 0) | 10,500 | Hz |
| Mass (one proof mass) | 4.00E−08 | kg |
| Sense capacitance area (one proof mass, sum of two sense capacitors) | 2.00E+06 | $\mu m^2$ |
| Sense capacitor gap | 3 | $\mu m$ |
| Sense capacitance (one proof mass, sum of two sense capacitors) | 5.9 | pF |
| DC sense bias voltage | 5 | Volts DC |
| Sense freq. with DC sense bias only | 9994 | Hz |
| Phase of pump voltage | 0 | radians |

Table 2. Operating parameters for a MEMS gyroscope with internal nulling of the quadrature signal at $V_p$=10 V, and unconditionally stable operation for all pump voltages. The derivatives of sense capacitance with respect to proof mass displacement are calculated assuming parallel plate capacitors.

FIG. 4 is a graph of the Coriolis (in-phase) and quadrature mechanical gains for the design parameters of Table 2, as functions of the pump voltage. FIG. 5 is a graph of the Coriolis (in-phase) and quadrature electrical gains for the design parameters of Table 2, as functions of the pump voltage. FIG. 6 is a graph of the total Coriolis (in-phase) and quadrature gains for the design parameters of Table 2, as functions of the pump voltage. The total gain is calculated by multiplying the mechanical and electrical gain of FIGS. 4 and 5.

Figure 7:
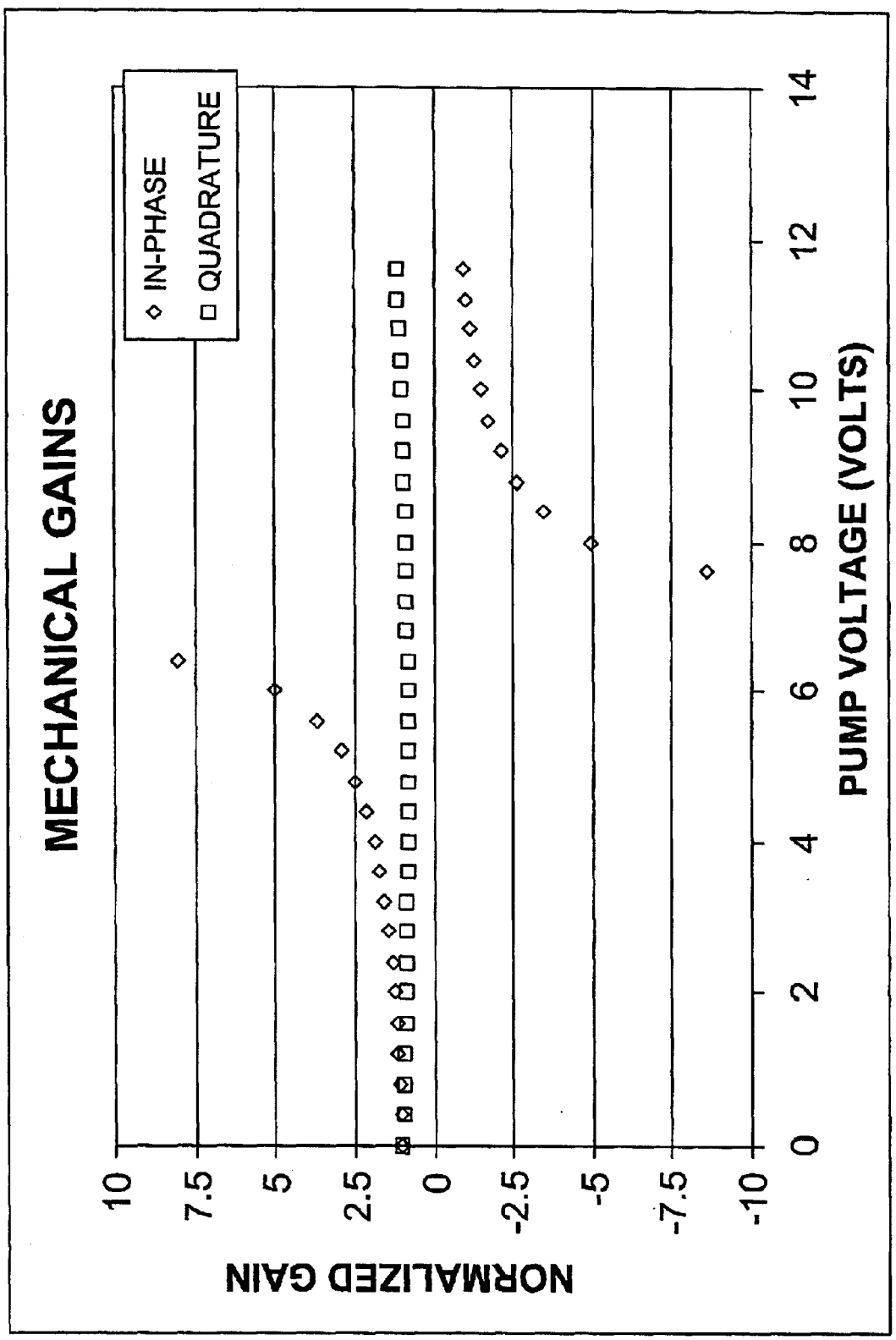
FIG. 7 is a graph showing mechanical gain as a function of pump voltage for a further embodiment of the invention.
Figure 8:
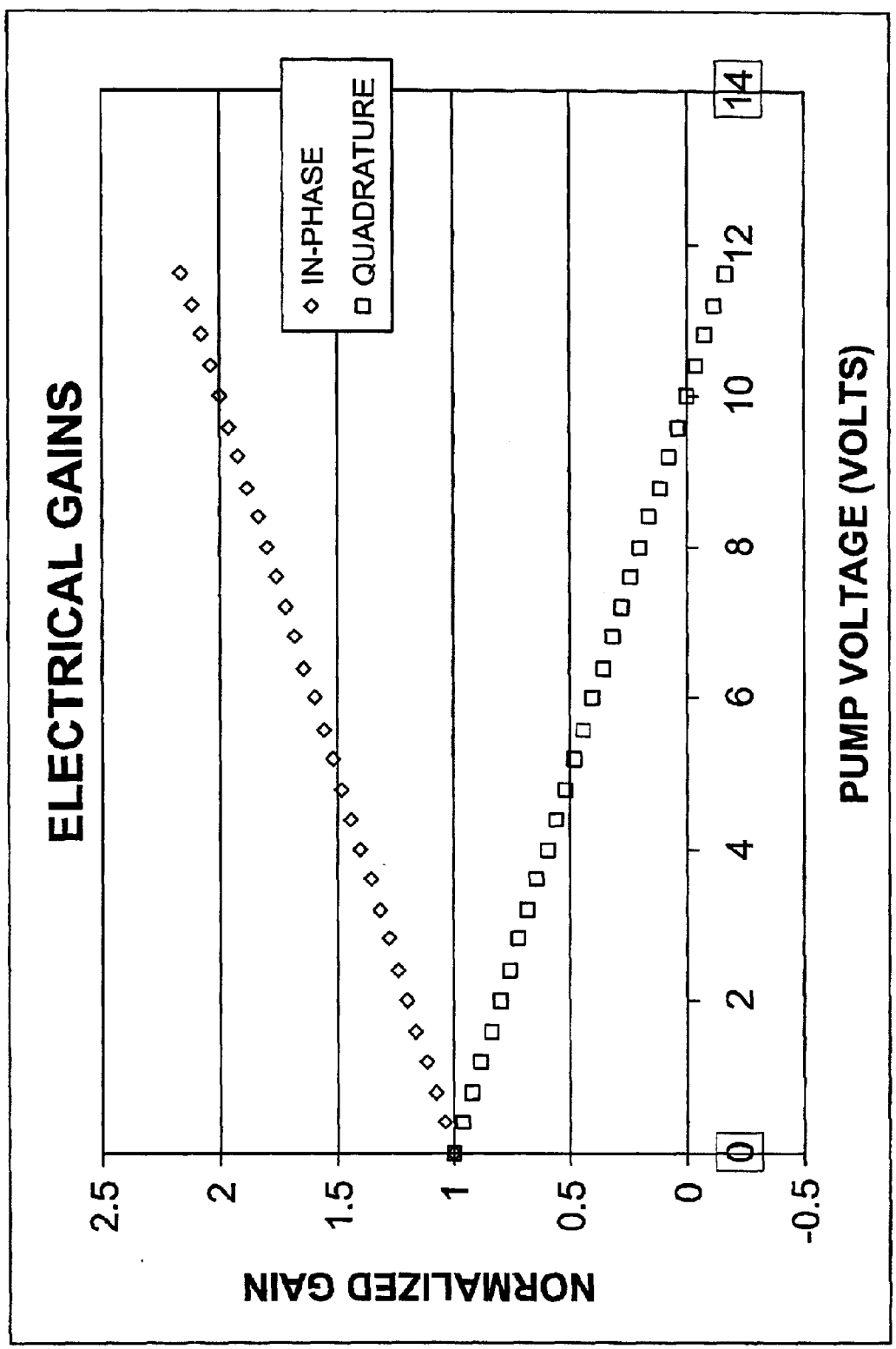
FIG. 8 is a graph showing electrical gain as a function of pump voltage for a further embodiment of the invention.
Figure 9:
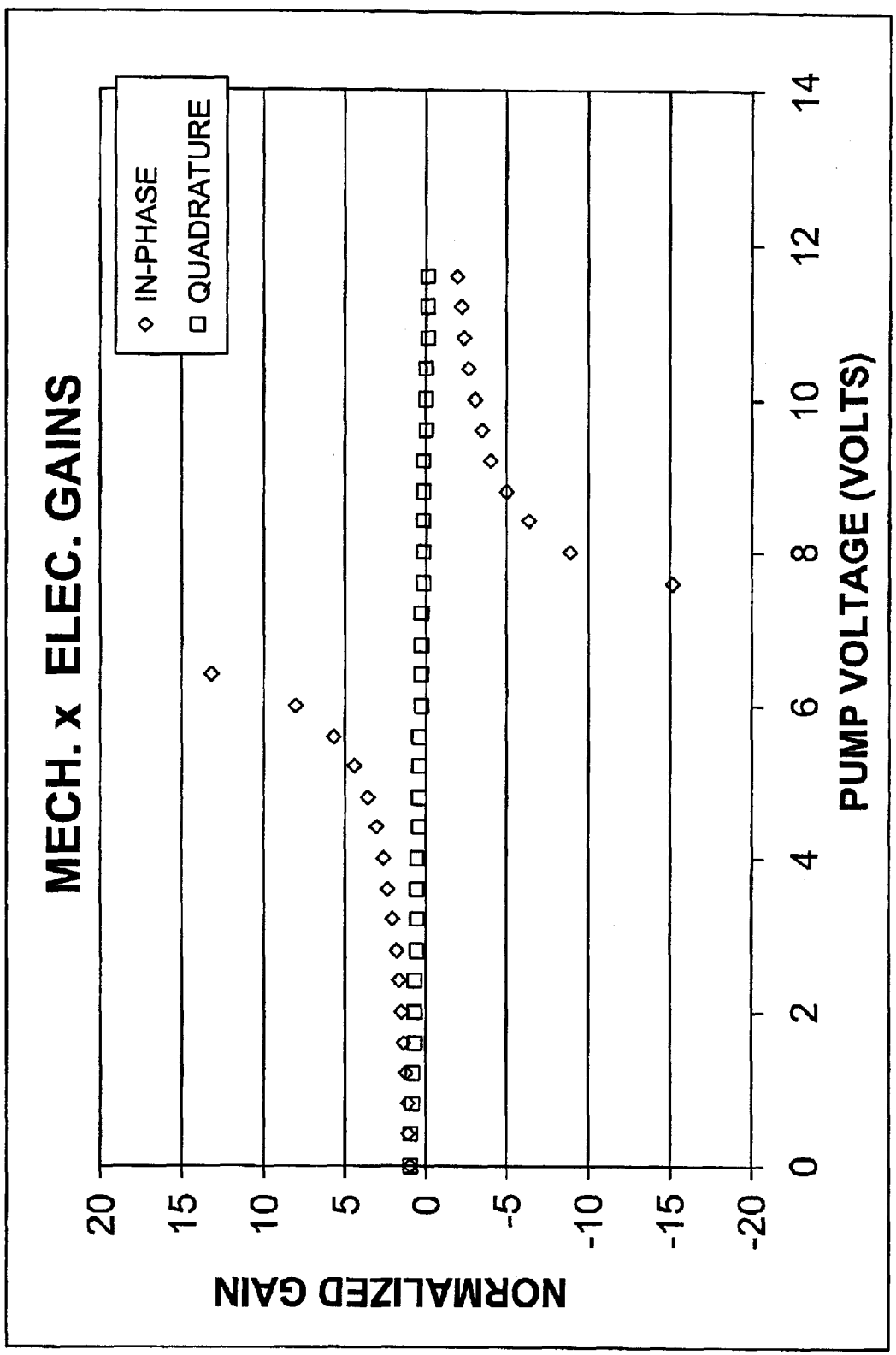
FIG. 9 is a graph showing total gain as a function of pump voltage for a further embodiment of the invention.

Design for high Coriolis signal gain: The sensitivity of many MEMS gyroscopes is limited by noise in the readout electronics. One way to move closer to the fundamental limit of thermal mechanical noise limited sensitivity is to increase the gain of the sensor itself. This can be achieved by proper choice of the pump voltage and phase. Table 3 shows the design parameters for a MEMS gyroscope designed for high Coriolis signal gain at pump voltages approaching the instability at a pump voltage of about 7 V. This design is nearly the same as the design in Table 2, except that the sense frequency is above the motor frequency, so that electrostatic spring softening moves the sense and motor frequencies closer together. This increases the mechanical gain, but the gyroscope becomes more unstable. FIGS. 7, 8 and 9 show the mechanical gain, electrical gain, and total gain as functions of the pump voltage for this design. These two designs are representative of just two of the potential designs that are within the invention as claimed. Many of the parameters may be varied without departing from the scope of the invention as is readily apparent to one skilled in the art. In some instances, instability may be desired. For example, the instability could provide an electromechanical oscillator.

| Parameter | Value | Units |
|---|---|---|
| Motor resonant frequency | 11,000 | Hz |
| Sense resonant frequency ($V_b$ = 0, $V_p$ = 0) | 12,500 | Hz |
| Mass (one proof mass) | 4.00E−08 | kg |
| Sense capacitance area (one proof mass, sum of two sense capacitors) | 2.00E+06 | $\mu m^2$ |
| Sense capacitor gap | 3 | $\mu m$ |
| Sense capacitance (one proof mass, sum of two sense capacitors) | 5.9 | pF |
| DC sense bias voltage | 5 | Volts DC |
| Sense freq. with DC sense bias only | 12,078 | Hz |
| Phase of pump voltage | 0 | radians |

Table 3. Operating parameters for a MEMS gyroscope with high Coriolis signal gain near the instability at a pump voltage of about 7 V. The derivatives of sense capacitance with respect to proof mass displacement are calculated assuming parallel plate capacitors.

FIG. 7 is a graph of the Coriolis (in-phase) and quadrature mechanical gains for the design parameters of Table 3, as functions of the pump voltage. FIG. 8 is a graph of the Coriolis (in-phase) and quadrature electrical gains for the design parameters of Table 3, as functions of the pump voltage.

FIG. 9 is a graph of the total Coriolis (in-phase) and quadrature gains for the design parameters of Table 3, as functions of the pump voltage. The total gain is calculated by multiplying the mechanical and electrical gain of FIGS. 7 and 8.

What is claimed is:

1. A micro electromechanical gyroscope comprising:
    a proof mass;
    a motor driver that oscillates the proof mass at its resonant frequency in a motor mode of oscillation;
    a sense electrode positioned proximate the proof mass to detect oscillation of the proof mass in a sense mode of oscillation; and
    a pump coupled to the sense electrode that provides a force at twice the resonant frequency of the motor mode of oscillation.

2. The microelectromechanical gyroscope of claim 1 and further comprising an output circuit coupled to the proof mass.

3. The microelectromechanical gyroscope of claim 2 wherein the output circuit comprises an operational amplifier having parallel resistive and capacitive feedback.

4. The microelectromechanical gyroscope of claim 1 wherein the force provided by the pump is caused by an electrical signal having a DC component and an AC component.

5. The microelectromechanical gyroscope of claim 4 wherein a voltage of the AC component is approximately twice a voltage of the DC component.

6. The microelectromechanical gyroscope of claim 1 and further comprising springs coupled to the proof mass.

7. The microelectromechanical gyroscope of claim 6 wherein the proof mass is suspended from a substrate by the springs.

8. The microelectromechanical gyroscope of claim 7 wherein the substrate is formed of silicon or pyrex.

9. The microelectromechanical gyroscope of claim 1 wherein a frequency of the motor mode of oscillation is greater than a frequency of the sense mode of oscillation.

10. A method of measuring Coriolis force, the method comprising:
    oscillating a proof mass at its resonant frequency in a motor mode of oscillation;
    providing a pumping force to a sense mode of oscillation of the proof mass at approximately twice the resonant frequency and substantially perpendicular to the motor mode of oscillation; and
    detecting oscillation of the proof mass caused by the Coriolis force in the sense mode of oscillation.

11. The method of claim 10 and further comprising providing the detected oscillation to an output circuit coupled to the proof mass.

12. The method of claim 10 wherein the pumping force is caused by an electrical signal having a DC component and an AC component.

13. The method of claim 12 wherein a voltage of the AC component is approximately twice the voltage of a DC component.

14. The method of claim 13 wherein the proof mass is formed of silicon.

15. The method of claim 10 wherein the proof mass is suspended from a substrate by springs.

16. The method of claim 10 wherein a frequency of the motor mode of oscillation is greater than a frequency of the sense mode of oscillation.

17. The method of claim 10 wherein a frequency of the motor mode of oscillation is approximately less than a frequency of the sense mode of oscillation.

18. A microelectromechanical gyroscope comprising:
    a pair of proof masses suspended from a substrate by springs;
    a motor driver that oscillates the proof masses at their resonant frequency in a motor mode of oscillation;
    two pair of sense electrodes, each pair sandwiching a different proof mass, which operates as a further sense electrode to form sense capacitors for each proof mass to detect oscillation of the proof masses in a sense mode of oscillation; and
    a pump coupled to the sense electrodes that provides a force at approximately twice the resonant frequency of the motor mode of oscillation.

19. The microelectromechanical gyroscope of claim 18 wherein the force provided by the pump is caused by an electrical signal having a DC component and an AC component.

20. The microelectromechanical gyroscope of claim 18 wherein a voltage of the AC component is approximately twice a voltage of the DC component.

21. The microelectromechanical gyroscope of claim 18 wherein the proof mass is formed of silicon.

22. A method of measuring Coriolis force, the method comprising:
    oscillating a proof mass suspended by a spring at its resonant frequency in a motor mode of oscillation;
    providing a pumping force to a sense mode of oscillation of the proof mass at approximately twice the resonant frequency and substantially perpendicular to the motor mode of oscillation; and
    detecting oscillation of the proof mass caused by the Coriolis force in the sense mode of oscillation.

23. A method of measuring Coriolis force, the method comprising:
    oscillating a pair of proof masses suspended by springs at their resonant frequency in a motor mode of oscillation;
    providing a pumping force to a sense mode of oscillation of the proof masses at approximately twice the resonant frequency and substantially perpendicular to the motor mode of oscillation; and
    detecting oscillation of the proof masses caused by the Coriolis force in the sense mode of oscillation.

* * * * *

UNITED STATES PATENT AND TRADEMARK OFFICE
CERTIFICATE OF CORRECTION

PATENT NO. : 6,715,353 B2  
DATED : April 6, 2004  
INVENTOR(S) : Johnson

It is certified that error appears in the above-identified patent and that said Letters Patent is hereby corrected as shown below:

<u>Column 5,</u>  
Line 60, delete "cot" and insert -- ωt --, therefor.  
Line 67, delete "B sin(Φ=$\theta$-$\psi$)" and insert -- B sin(Φ-$\theta$-$\psi$) --, therefor.

Signed and Sealed this

Nineteenth Day of April, 2005